(12) United States Patent
Pellegrini et al.

(10) Patent No.: US 12,240,685 B2
(45) Date of Patent: Mar. 4, 2025

(54) FLEXIBLE PACKAGE FOR FOOD OR BEVERAGE PREPARATION HAVING A RIGID PART

(71) Applicant: SOCIETE DES PRODUITS NESTLE S.A., Vevey (CH)

(72) Inventors: Stephane Pellegrini, Montperreux (FR); Olivier Jean-Michel Martin, Orbe (CH); Alexey Vishtal, Lausanne (CH)

(73) Assignee: SOCIETE DES PRODUITS NESTLE S.A., Vevey (CH)

( * ) Notice: Subject to any disclaimer, the term of this patent is extended or adjusted under 35 U.S.C. 154(b) by 58 days.

(21) Appl. No.: 18/006,966

(22) PCT Filed: Jun. 24, 2021

(86) PCT No.: PCT/EP2021/067328
§ 371 (c)(1),
(2) Date: Jan. 26, 2023

(87) PCT Pub. No.: WO2022/022902
PCT Pub. Date: Feb. 3, 2022

(65) Prior Publication Data
US 2023/0286732 A1 Sep. 14, 2023

(30) Foreign Application Priority Data
Jul. 30, 2020 (EP) .................................. 20188741

(51) Int. Cl.
*B65D 85/804* (2006.01)
*B65D 65/42* (2006.01)

(52) U.S. Cl.
CPC ......... *B65D 85/8043* (2013.01); *B65D 65/42* (2013.01); *B65D 2203/06* (2013.01); *B65D 2565/382* (2013.01); *B65D 2565/387* (2013.01)

(58) Field of Classification Search
None
See application file for complete search history.

(56) References Cited

U.S. PATENT DOCUMENTS

| 4,010,676 A * | 3/1977 | Eilenberg | B65D 5/241 493/51 |
| 4,669,253 A * | 6/1987 | Shavit | B65B 43/10 493/929 |

(Continued)

FOREIGN PATENT DOCUMENTS

| AR | 123079 A1 | 10/2022 |
| CL | 2010000546 A1 | 8/2010 |

(Continued)

OTHER PUBLICATIONS

Chile Office Action for Appl No. 202300218 dated May 31, 2024, 14 pages.

(Continued)

*Primary Examiner* — Tanzim Imam
(74) *Attorney, Agent, or Firm* — K&L Gates LLP

(57) ABSTRACT

The present invention is directed to a closed flexible package comprising: (i) flexible or semi-flexible lateral walls (2) that form a flatten package body, and (ii) a cup-shaped bottom portion adapted to the insertion of a fluid injection element of the machine, the package body and cup-shaped bottom portion being formed from a one-piece elongated primary flat blank sheet made of flexible material, preferably a fiber-based material, that is folded in a U-shape around its transversal symmetry axis, and sealed along its lateral and upper edges, wherein said cup-shaped bottom portion is a hollow volume having a concave lower side and convex lateral sides, and the profile curvature of said lower side being identical to the profile curvature of each of said lateral sides.

18 Claims, 11 Drawing Sheets

(56) References Cited

U.S. PATENT DOCUMENTS

| | | | | |
|---|---|---|---|---|
| 10,455,970 | B2* | 10/2019 | Butscher | B65D 85/8052 |
| 2009/0214713 | A1* | 8/2009 | Banim | B29C 65/02 |
| | | | | 426/454 |
| 2016/0001970 | A1* | 1/2016 | Kaeser | A47J 31/407 |
| | | | | 99/275 |
| 2016/0347525 | A1* | 12/2016 | Butscher | A47J 31/407 |
| 2017/0291759 | A1* | 10/2017 | Austin | A47J 31/4403 |
| 2017/0347831 | A1* | 12/2017 | Perentes | A47J 31/4492 |
| 2018/0009587 | A1* | 1/2018 | Mosser | B65D 41/02 |
| 2020/0299047 | A1* | 9/2020 | Perea-OcHoa | B65D 77/28 |
| 2021/0188530 | A1* | 6/2021 | Pellegrini | B65D 85/816 |
| 2021/0188531 | A1* | 6/2021 | Pellegrini | A47J 31/407 |

FOREIGN PATENT DOCUMENTS

| | | |
|---|---|---|
| CL | 2017003181 A1 | 6/2018 |
| CL | 2017003182 A1 | 6/2018 |
| CN | 106809536 A | 6/2017 |
| CN | 110573438 A | 12/2019 |
| WO | 2007072020 | 6/2007 |
| WO | 2012175985 | 12/2012 |
| WO | 2016071156 | 5/2016 |
| WO | 2019228753 A1 | 12/2019 |

OTHER PUBLICATIONS

Argentina Office Action for Appl No. 20210102110 dated Nov. 20, 2024, 8 pages.

Chinese Office Action for Appl No. 202180061257.6 dated Dec. 28, 2024, 9 pages.

* cited by examiner

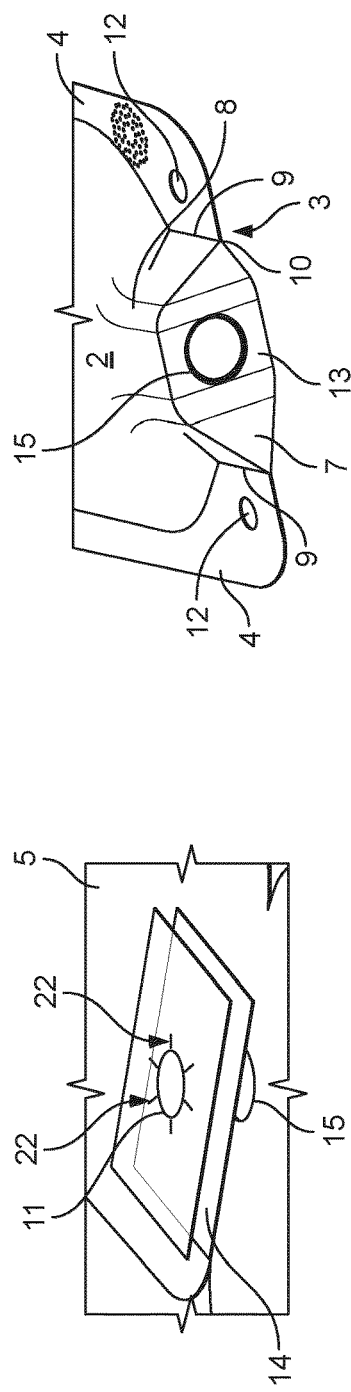
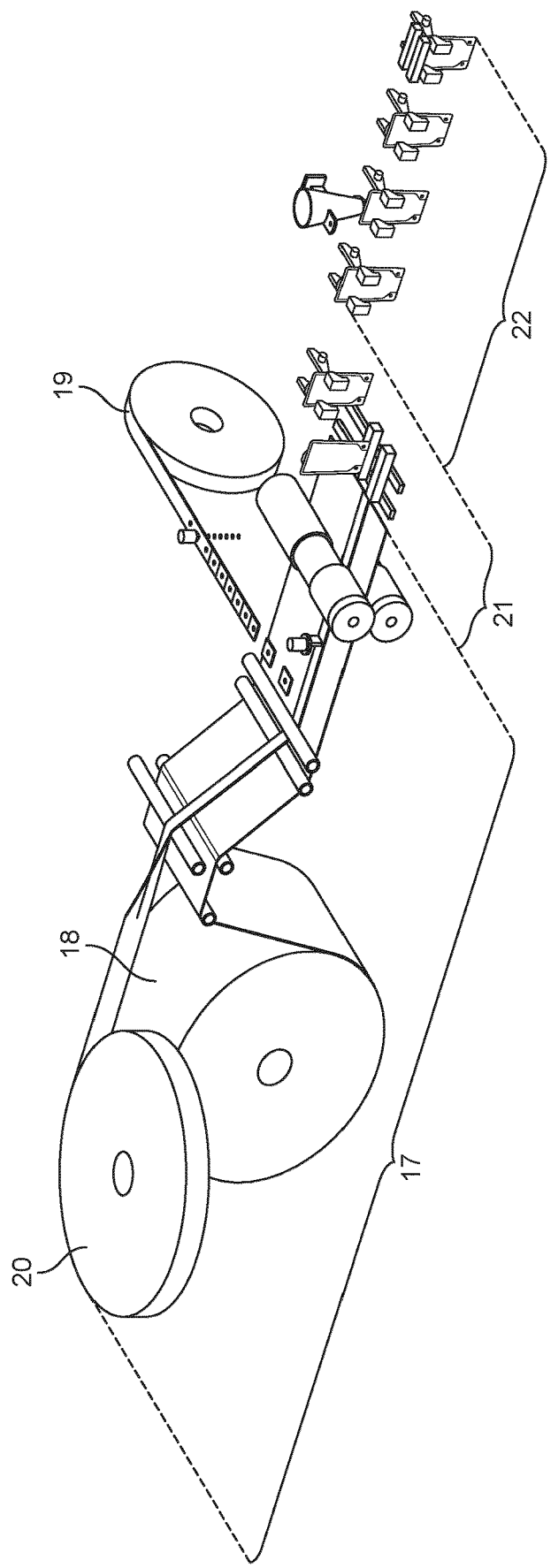
FIG. 4
FIG. 5
FIG. 6

FLEXIBLE PACKAGE FOR FOOD OR BEVERAGE PREPARATION HAVING A RIGID PART

CROSS REFERENCE TO RELATED APPLICATIONS

The present application is a National Stage of International Application No. PCT/EP2021/067328, filed on Jun. 24, 2021, which claims priority to European Patent Application No. 20188741.1, filed on Jul. 30, 2020, the entire contents of which are being incorporated herein by reference.

FIELD OF THE INVENTION

The present invention relates to a closed flexible sachet, said sachet containing a beverage ingredient and being adapted for use in a beverage preparation machine by piercing a sachet wall and injecting a liquid therein for mixing with said ingredient.

BACKGROUND OF THE INVENTION

Preparing beverages by introducing a capsule containing a food or beverage ingredient, such as soluble coffee, milk or a chocolate in a beverage dispensing machine, and then injecting water into the capsule for mixing with the ingredient, is known in the state of the art. The soluble beverage or food ingredient is typically dissolved into water to form the beverage or the desired final product, which flows out of the capsule through a suitable outlet. Sometimes, the ingredient can be tea leaves and the beverage is prepared by infusing the leaves with water introduced in the capsule. As it is the case for soluble ingredient mentioned above, the tea thus infused in then dispensed out of the capsule through a dispensing outlet. Such known capsules are typically rigid or semi-rigid capsules made of plastic material(s), or metal (e.g. aluminium).

Recently, beverage preparation systems have been developed which comprise flexible packages instead of capsules. Such packages bring some interesting features compared to capsules, such as compactness, manufacturing speed (forming, filling and sealing operations can be performed in a row), enhanced recycling capabilities.

Such flexible packages are described for instance in EP 3 414 187 A1 and comprise a flexible wall and a functional insert located at the bottom of the package—sometimes named "spout"—which is attached, or otherwise wrapped into the flexible wall. The insert is a plain element made of rigid or semi-rigid plastic and comprises holes and channels for connecting the bottom side of the flexible package to the beverage machine in a fluid-tight manner. In use, once the flexible package is functionally connected to the beverage machine, the latter introduces water inside the package through fluid-conducting channels of the insert, said water being then mixed with the ingredient to form a beverage product that is dispensed outside the flexible package through a product dispensing channel of the insert.

Importantly, the fluid communication between the package and the beverage machine is performed by connecting a fluid conducting element of the machine to a flat wall surface of the package; the flatness of the surface between the ingredient package and the beverage machine ensures substantial leak-tightness of the connection between the two. Furthermore, the rigidity of the package flat surface is essential to guarantee that the package does not deform during connection of the beverage machine. Generally, the connection is achieved by piercing through or otherwise inserting a connection element of the machine, such as a needle or similar element, through the flat surface of the package. The connection can also be performed by opening the package wall and pressing a nozzle of the machine against the package wall to create a leaktight fluid communication. If the flat wall of the package is mechanically too weak, it bends or otherwise deforms when the connection element of the beverage machine is pressed against, or inserted through said wall, which leads to leakage or even no fluid connection at all. On the other hand, the opening of the package by the machine must be easy and reliable; for this, the force required to open the package wall must be sufficiently low.

In some instances, described for example in EP 3 500 503 A1 or in EP 3 500 504 A1, the functional insert comprises several parts that are movable one relative to the other, such that the insert can be actuated for opening or closing itself, thus allowing complex sequences for water injection, mixing, and product dispensing, such sequences being adapted to particular preparation requirement imposed by the type of beverage ingredient to be dissolved. Reclosability of the insert also provides excellent cleanliness to the beverage preparation system.

Such existing flexible packages comprise drawbacks though. First, the functional insert is made of a material that is not easily recyclable. Furthermore, it is a plain element and is therefore heavy. Also, it is costly to manufacture.

Other flexible packages such as gusseted bags or pouches exist. Such packages are made by folding and sealing a thermoplastic material, forming a gusset at their bottom side wall. Although such gusseted sachets are able to form a flat bottom side wall that may be used for connecting to a beverage machine, manufacturing such sachets requires a complex multi-fold process for forming the gusseted bottom. Due to the multiple folding, superimposed layers of material are created which are then sealed. This well-known manufacturing process requires good sealing properties for the material which can only be obtained with thermoplastic films. If non-thermoplastic films are used, the weaker sealing leads to the creation of delaminations or even non-sealed spaces in between the folded layers of film, which is highly detrimental to the mechanical and barrier properties of the package. Again, such gusseted flexible packages are undesirable because they require thermoplastic material for forming, which is not environmentally friendly.

Other types of flexible packages are known which are manufactured by various processes such as folding or punching a flexible flat blank material, for forming three dimensional volumes. However, the known processes often lead to the formation of wrinkles at the surface of the package during transformation of the flexible flat sheet into a three-dimensional volume. Wrinkles are highly undesirable because they lead to inconsistent sealing of the package, and thus to leakage. They also increase the risk of faulty interaction between the package and a processing unit such as for instance a beverage preparation machine, due to the irregular surface of said package.

For ensuring that the package is environmentally friendly, the package walls can be made for instance of a fiber-based material that can also be coated e.g. with a biodegradable material that provides barrier properties against moisture or gas transfer, and/or sealing properties. During opening of the flexible package by an opening element of the beverage machine, such as a piercing needle for example, a few particles (e.g. fibers) of the package wall material can detach and be entrained into the package compartment. Although such phenomenon is limited, it is desirable to prevent it.

It is therefore a main purpose of the present invention, to provide an improved flexible package for use with a beverage preparation machine, that obviates the above mentioned drawbacks of existing packages, and in particular is made of a environmentally friendly material, and can easily be connected to a beverage machine in a neat and leaktight manner.

SUMMARY OF THE INVENTION

The invention is directed to a flexible or semi-flexible closed package for containing an ingredient for preparing an edible product in a food or beverage preparation machine, by mixing said ingredient with a mixing fluid injected in said package by said machine, said package comprising:
 (i) flexible or semi-flexible lateral walls that form a flatten package body, and
 (ii) a cup-shaped bottom portion adapted to the insertion of a fluid injection element of the machine,
the package body and cup-shaped bottom portion being formed from a one-piece elongated primary flat blank sheet made of flexible material, preferably a fibre-based material, that is folded in a U-shape around its transversal symmetry axis, and sealed along its lateral and upper edges, wherein said cup-shaped bottom portion is a hollow volume having a concave lower side and convex lateral sides, and the profile curvature of said lower side being identical to the profile curvature of each of said lateral sides, the primary sheet comprising a primary hole that is punched through its entire thickness, said primary hole being located on the lower side of said cup-shaped bottom portion, and wherein said package further comprises:
 a secondary thickness reinforcement sheet located at least on the inner surface of the cup-shaped bottom portion of said package, said secondary sheet comprising a secondary hole, and
 a tertiary thin sheet sandwiched between the walls of the package and the secondary thickness reinforcement sheet.

In one embodiment, the cup-shaped bottom portion has an hexagonal prism shape, said prism having two opposed vertical edges aligned with the package transversal axis, that extend downwardly to form downwardly extending tips, said extended edges having a height such that, for each transversal cross section of the package measured all along its transversal axis, the sum of two heights of the cup-shaped bottom portion plus the width of its lower side, is constant.

Preferably, said one-piece elongated primary flat blank sheet is made of a fibre-based material coated on its inner side with a sealant layer, said fibre-based layer being selected within the list of: paper, cardboard, cabasse-based, bamboo-based or starch-based material, cellophane, or a combination thereof.

Furthermore, the primary flat blank sheet preferably further comprises a barrier coating sandwiched between the fibre-based material and the sealant layer, said barrier coating being a coating against oxygen and/or moisture transfer, and selected within the list of: metallization coating, silicone oxide (SiOx) coating, aluminium oxide (AlOx) coating, atomic layer deposition (ALD) coating, or a combination thereof.

Advantageously, the diameter of the primary and secondary holes is comprised between 1 mm and 20 mm, preferably between 5 mm and 12 mm. More preferably, the diameter of primary hole is equal or superior to the diameter of the secondary hole.

In a preferred embodiment of the invention, said secondary thickness reinforcement sheet comprises a plurality of radial cuts extending from the edge of the secondary hole radially outwardly. The length of each of said cuts is comprised within the range of 0.5 mm to 5 mm, preferably between 1 and 3 mm.

Advantageously, the secondary thickness reinforcement sheet is made of fibre-based material coated with a sealant layer, said fibre-based layer being selected within the list of: paper, cardboard, cabasse-based, bamboo-based or starch-based material, cellophane, or a combination thereof.

Said tertiary thin sheet is advantageously a thin layer selected within the list of: polyethylene (PE), polypropylene (PP), polylactide (PLA), polyhydroxyalcanoates (PHA), polybutylene adipate terepthalate (PBAT), polybutylene succinate (PBS), polyvinyl alcohol (PVOH), starch-based polymers, a polymer comprising food-grade oxygen and/or moisture scavengers, or a combination thereof. More preferably, said tertiary thin sheet is made from blown or cast polymer film having stretch properties.

In a beneficial embodiment of the invention, the package comprises identification means selected within the list of: mechanical codes, optical codes (including colour codes and codes printed with non-visible ink), RFID tags, one-dimensional bar codes, two-dimensional bar codes, magnetic codes, conductivity codes, detection holes, or any combination thereof.

Preferably, the package further comprises centring traversing holes located in the sealed edges of said package, said holes being adapted to the insertion of centring pins of the beverage preparation machine, so as to prevent movement of said package relatively to the machine, during beverage preparation.

In one preferred embodiment, the concave lower side of the cup-shaped bottom portion comprises a flat portion centered across the transversal and longitudinal axes of the cup-shaped bottom portion.

In a possible embodiment of the invention, the package is a sachet or a pouch.

The ingredient contained within the package of the invention can be for instance a water soluble powder, or a soluble concentrate in liquid or semi-liquid form, selected within the list of: soups, fruit juices, vegetable juices, bouillons, coffee, chocolate, tea, dairy components such as milk or creamer, smoothies, purees, coulis, creams or a combination thereof, or said ingredient comprises plant leaves adapted to infusion in water.

The package of the invention comprises generally flexible—or semi-flexible—lateral walls that allow excellent quality of the beverage product by enhanced dissolution of the contained ingredient with the mixing fluid (typically water) injected therein. At the same time, the interface part of said package (i.e. its bottom portion) with the food or beverage preparation machine it is designed to be connected to, is sufficiently rigid to prevent deformation of said package when the machine is fluidly connected thereto. As its outside walls are manufactured from one single blank sheet folded in two, it is particularly ecologically friendly (what is more, its constitutive material is preferably chosen from ecologically friendly materials, such as recyclable, biodegradable, industrially compostable or home compostable materials). The three-dimensional folding of its bottom interface provides sufficient rigidity to allow a proper opening during usage by an external tool (such as for instance the water injection needle of a food or beverage preparation machine), and what is more, this three-dimensional folded bottom portion is deprived of folding wrinkles which could be detrimental to the proper functioning of said package.

What is more, the package according to the invention has advantage that when a fluid injection element of the food or beverage preparation machine is inserted through the wall of said package, it goes through a stretchable material of the tertiary insert, such that the edges of the pierced sheet conform closely to the surface of the fluid injection element, thus providing leak tightness at the interface between the package and the outer surface of the machine's fluid injection element (for instance a water injection needle), thus ensuring a clean fluid communication between the two.

Such a configuration also has the advantage that it requires a low strength for piercing the package wall by the fluid injection element, because the overall package thickness is reduced in the region which is to be perforated or otherwise opened by the fluid injection element of the machine, while at the same time, the entire portion of the package which surrounds said region has a higher thickness, hence higher mechanical resistance to deformation.

BRIEF DESCRIPTION OF THE DRAWINGS

Additional features and advantages of the present invention are described in, and will be apparent from, the description of the presently preferred embodiments which are set out below with reference to the drawings in which:

FIG. 4 is an enlarged partial perspective top view of one embodiment of the blank of FIG. 2;

FIG. 5 is a partial bottom perspective view of a package formed with the blank of FIG. 4;

FIG. 6 is a schematic perspective view of a manufacturing machine for making a package per the invention;

DETAILED DESCRIPTION OF THE INVENTION

Figure 1:
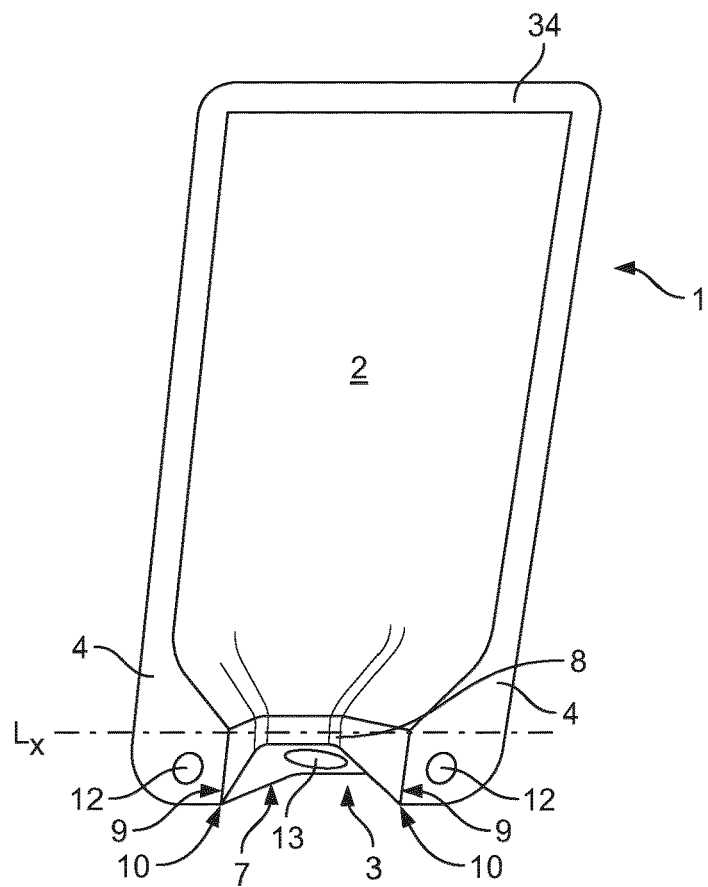
FIG. 1 is a side perspective view of a package per the invention.

The package according to the present invention is adapted to be used in a food or beverage preparation machine (not illustrated in the drawing). The beverage preparation machine can be of any suitable type but for instance it is a machine as described in the patent application EP AN 19213419.5. Such machines are well known in the art, and comprise a brewing chamber adapted to receive an ingredient package, an injection element adapted to inject a fluid (typically water) inside the ingredient package, a fluid (e.g. water) supply means generally comprising a fluid reservoir (or a water connection to tap water), a fluid pump, a fluid heater, and fluid pipes for circulating said fluid from the fluid supply towards the brewing chamber, optionally through the heater.

In the case of the present invention, the package is adapted to be opened, preferably pierced, by fluid supply means of the machine, in particular by introduction of a sharp element through a bottom portion wall of said package, preferably through the lower side of said bottom portion wall. Typically, the fluid injection element of the machine is a hollow needle-shaped element. Dispensing of the food or beverage product prepared within the package by mixing of the fluid with the ingredient, can be performed by gravity; however, the withdrawal of the finished food or beverage product can also be performed through the same element which injects the mixing fluid. In this latter case, the injection and dispensing element of the machine comprises at least two channels: one channel connects fluidly the inner compartment of the package to the machine so that said machine can inject fluid (e.g. water) into said compartment, and a second channel that connects the inner package compartment to the outside of said package. The injection means of the machine can also comprise a supplemental channel for injecting air inside the package during food or beverage preparation. Injecting air allows to enhance foaming during preparation of specifically aerated products like dairy-based products (e.g. foamed milk), or chocolate-based products (foamed chocolate beverages, chocolate mousses), or smoothies.

Generally, the package has any possible shape compatible with forming by folding a flexible sheet in two ("U-shape" forming), such as a pouch or a sachet, a pad, or any other container having a generally flatten configuration.

Different sizes of the package can be used in a same machine adapted to store different quantities of ingredients. The size of the package (i.e. its height and/or width) does not limit the type of machine that can be used to extract the ingredient contained therein. The size of the package is adapted to the volume of beverage to be produced; for instance americanos or soups require large packages, whereas smaller sachets are used for producing short cups such as espressos. Medium size sachets are used for producing foamed milk for cappuccinos.

The external design of the sachet bottom—which is the part of the package which is dedicated to the functional fluid connection with the beverage machine—remains unchanged whatever the product to be produced and the size or shape of the package. The main idea is that the interface of the package with the machine is always the same. Also, other parameters such as the flow rate of fluid injected and/or the temperature of the fluid injected and/or the total volume of fluid injected, can be modified as a function of the ingredient to be processed and therefore as a function of the food or beverage to be produced.

The package preferably comprises identification means for the beverage machine to automatically identify the type of ingredient contained therein, and adapt its settings for optimal beverage preparation. Such settings include but are not limited to: water injection pressure, water injection volume, water temperature, dissolution sequence (complex sequence of water injection, air injection, beverage dispensing, in a sequential or simultaneous manner), injection of air together with the water (for foam enhancement), total time for extraction. Such identification means are selected within the list of: mechanical codes, optical codes (including colour codes and codes printed with non-visible ink), RFID tags, one-dimensional bar codes, two-dimensional bar codes, magnetic codes, conductivity codes, detection holes, or any combination thereof.

As illustrated in the figures attached, in a preferred embodiment, the package presents a plane shape oriented along a plane essentially vertically oriented during beverage production and the fluid injection element of the beverage machine is inserted within the package such that it orientates the jet of aqueous and/or gaseous fluid in a direction comprised in said package plane. The fluid jets introduced from the bottom into the package develop into circular and spiral movements creating turbulences, frictions and high contact surfaces between the fluid molecules and the ingredient particles. In average the fluid molecules swirl several times within the container until they leave it together as a finished beverage or food product.

In the following, a preferred embodiment of the package according to the invention will now be described in reference to the drawings. In this preferred embodiment, the package is a sachet.

FIG. 1 shows the flexible or semi-flexible closed package 1 for containing an ingredient according to the invention. Said package 1 comprises:
(i) flexible or semi-flexible lateral walls 2 that form a flatten package body, and
(ii) a cup-shaped bottom portion 3 being a hollow volume, and adapted to the insertion of a fluid injection element of the food or beverage preparation machine (not illustrated) to which said package 1 is designed to be connected to.

The hollow cup-shaped bottom portion 3 does not necessarily form the entire bottom of the package. In the embodiment of FIG. 1, it forms only a central portion of the entire bottom of the package and is surrounded by the side edges 4 of the package which are sealed flat areas.

Figure 2:
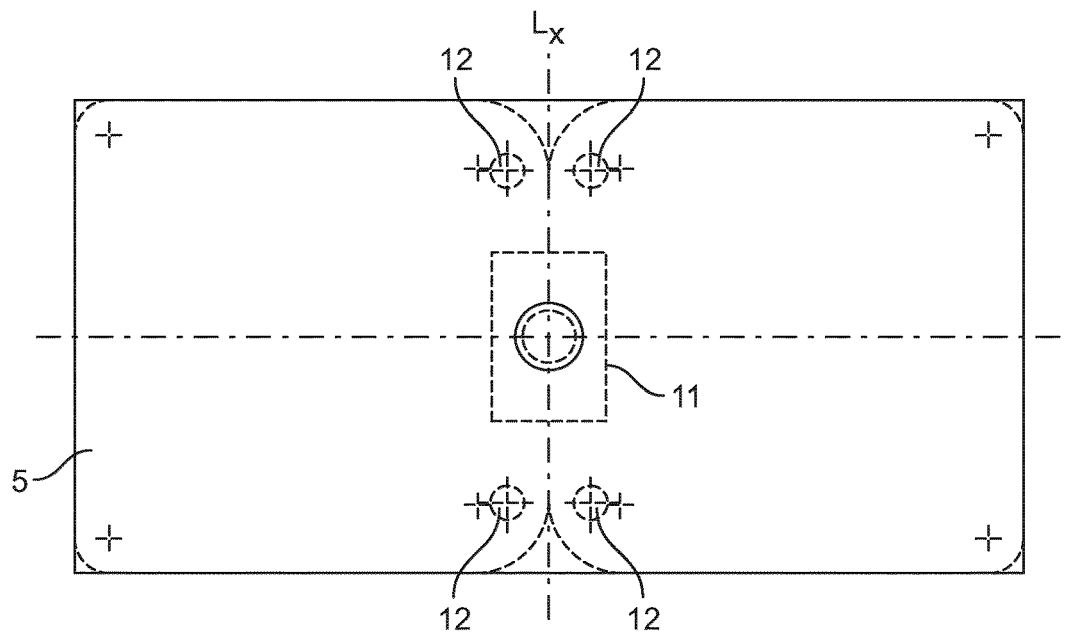
FIG. 2 is a top view of a primary flat blank sheet per the invention.

The package 1 is formed from a one-piece elongated primary flat blank sheet 5 made of flexible material, illustrated in FIG. 2. The manufacturing process steps and the manufacturing machine will be described in more detail here after.

The primary flat blank sheet 5 of paper-based material is U-shape folded around its transversal symmetry axis Lx, and then sealed along its side edges 4 and upper edge 6.

Figure 3A:
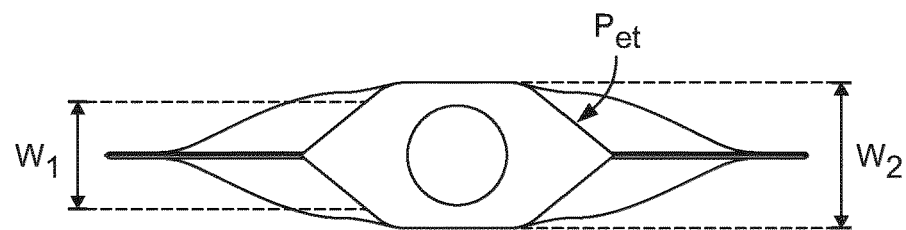
FIG. 3A is a bottom view of the package of FIG. 1.
Figure 3B:
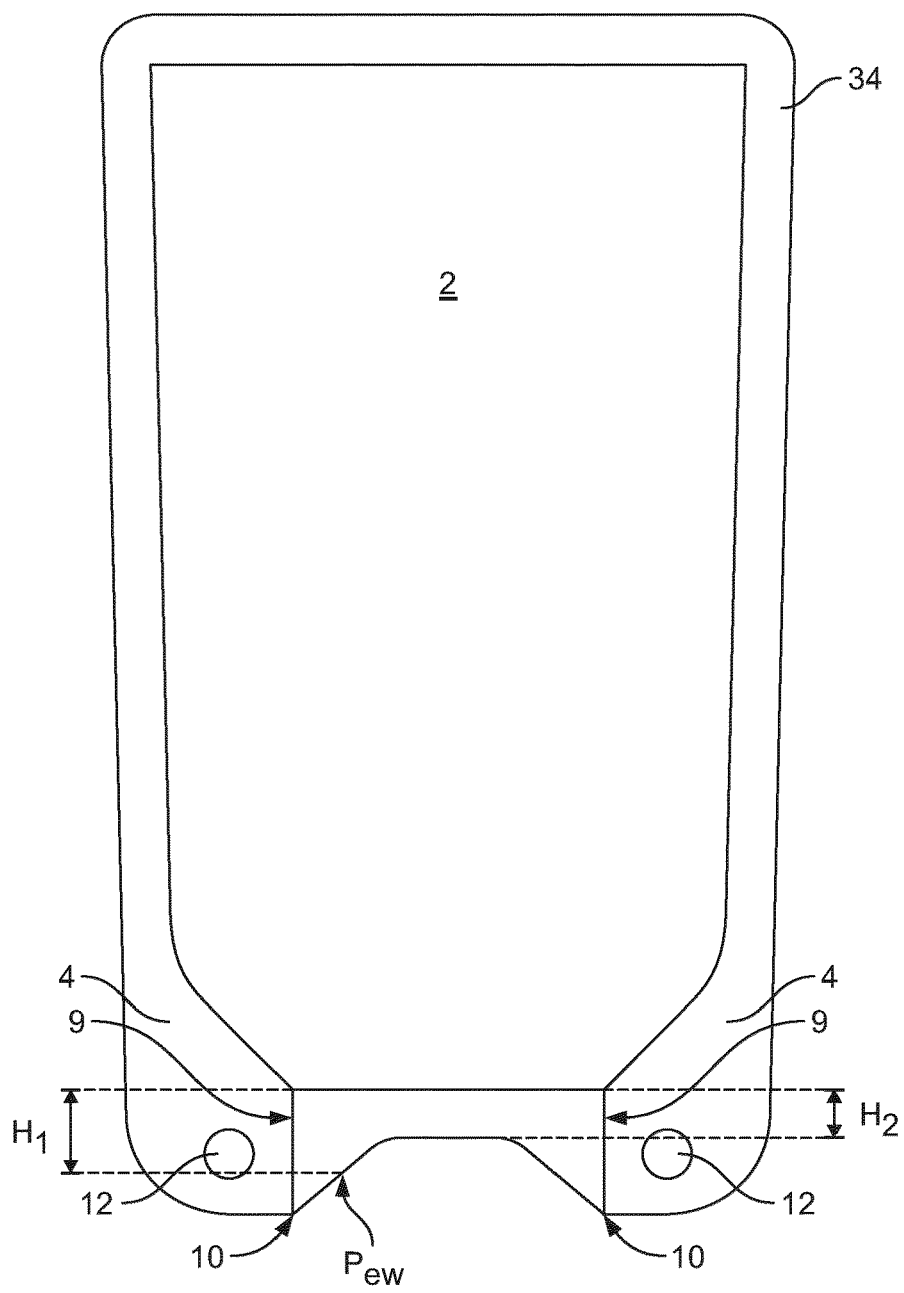
FIG. 3B is a side view of the package of FIG. 3A.

According to a general principle of the invention, as illustrated in FIGS. 3A and 3B, the cup-shaped bottom portion 3 is a hollow volume having a concave lower side 7 and convex lateral sides 8, and the profile curvature $P_{lw}$, of said concave lower side—visible when the package is seen from the side as illustrated with a thick line in the profile view of FIG. 3B—, is identical to the profile curvature Pit of each of said lateral sides—visible when the package is seen from below as illustrated with a thick line in the bottom view of FIG. 3A—.

More precisely, in the embodiment illustrated in FIGS. 1, 3A, 3B and 5, said cup-shaped bottom portion is a hollow volume that has an hexagonal prism shape, said prism having two opposed vertical edges 9 aligned with the package transversal axis Lx, said vertical edges 9 extending to form downwardly extending tips 10. The extended edges 9 have a height that is such that, for each transversal cross section of the package measured all along its transversal axis Lx, the sum of two heights of the cup-shaped bottom portion plus the width of its lower side, is constant. An example of this rule is illustrated in FIGS. 3A and 3B. FIG. 3A shows a first width "W1" of the lower side measured in a first cross-section of the bottom portion. FIG. 3B shows a first height "H1" for the cup-shaped bottom portion, which is measured for the same first cross-section. FIG. 3A further shows a second width "W2" of the lower side measured in a second cross-section of the bottom portion. FIG. 3B also shows a second height "H2" for the cup-shaped bottom portion, which is measured for the same second cross-section. If calculating the sum S1=(2×H1)+W1, and then S2=(2×H2)+W2, according to the principle of the invention, S1=S2, and more generally, S1=S2=Sn (with Sn being measured at any cross sectional point of the cup-shaped bottom portion 3).

The one-piece elongated primary flat blank sheet 5 that is used for manufacturing the package 1 is made of a paper material coated on its inner side (that is to say the side which will be the inner side of the package 1 after forming of said sheet 5) with a sealant layer.

Furthermore, in the present embodiment of the invention, said primary flat blank sheet 5 further comprises a barrier coating sandwiched between the fibre-based material and the sealant layer, said barrier coating being a coating against oxygen and moisture transfer. Said barrier coating is selected within the list of: metallization coating, silicone oxide (SiOx) coating, aluminium oxide (AlOx) coating, atomic layer deposition (ALD) coating, or a combination thereof.

In a preferred embodiment of the invention, illustrated in FIG. 2, the package 1 further comprises a secondary thickness reinforcement sheet 11 located on the inner surface of the cup-shaped bottom portion 3 of said package. Said thickness reinforcement sheet 11 is made of a paper material coated with a sealant layer. This thickness reinforcement sheet 11 provides the possibility to decrease the thickness of the lateral walls 2 of the package 1. Decreasing this thickness makes these lateral walls much more flexible which was found an advantage for enhancing the quality of the product prepared within the package 1. More precisely, the applicant has surprisingly found that the swirling movement of fluid injected inside the package is improved is the lateral walls 2 of the package are able to flex and deform outwardly during a beverage preparation. Such a deformation increases temporarily the inner space of the package compartment between the lateral walls 2 of said package. However, maintaining a good rigidity of the cup-shaped bottom portion 3 is essential as explained above (to maintain a proper sealing at the interface between the package and the beverage preparation machine, and also to ensure that the package does not deform or collapse when pierced by the fluid injection element of the machine, which would compromise or even prevent the piercing operation). The presence of the secondary thickness reinforcement sheet 11 allows to achieve a balance between the flexibility of the one-piece walls of the package and the rigidity of its bottom portion.

Advantageously, the package 1 further comprises centring traversing holes 12, illustrated in FIGS. 1, 3B and 5, which are located in the sealed edges 4 of said package 1. Said holes are adapted in shape and diameter to accommodate centring pins (not illustrated in the drawing) of the beverage preparation machine, so as to prevent movement of said package 1 relatively to the machine, during beverage preparation, and especially during insertion of the fluid injection element of the machine through the package wall.

In a highly desirable embodiment, the concave lower side 7 of the package 1 comprises a flat portion 13 centered across the transversal and longitudinal axes of the cup-shaped bottom portion 3, as illustrated in FIGS. 1 and 5.

As illustrated in FIG. 4, and according to the principle of the claimed invention, the package 1 further comprises a tertiary thin layer between the material that makes the walls of the package (i.e. made from the primary flat blank sheet), and the secondary thickness reinforcement layer 11. This tertiary thin layer is produced by sealing or otherwise attaching a tertiary flexible flat blank sheet 14 in between said primary flexible flat blank sheet 5 and secondary flexible flat blank sheet 11.

Said tertiary flexible flat blank sheet 14 is a thin layer selected within the list of: polyethylene (PE), polypropylene (PP), polylactide (PLA), polyhydroxyalcanoates (PHA), polybutylene adipate terepthalate (PBAT), polybutylene succinate (PBS), polyvinyl alcohol (PVOH), starch-based polymers, a polymer comprising food-grade oxygen and/or moisture scavengers, or a combination thereof. It is preferably made from blown or cast polymer film having stretch properties.

As shown in FIG. 4, the primary sheet 5 comprises a primary hole 15 that is punched through its entire thickness. The primary hole is punched through said primary flat blank sheet before forming of the latter, and positioned such that when said flat blank is formed into a package according to the invention, said primary hole 15 is located on the lower side of said cup-shaped bottom portion 3. Preferably, the primary hole 15 is centered across said lower surface. This primary hole 15 has a diameter that is chosen to be at least equal to, but preferably a little bit greater in section (or diameter) than the outer diameter (or section) of the beverage machine injection means (which is typically a needle having the general shape of a cylinder with a diameter comprised between 1 mm and 20 mm, preferably between 5 mm and 12 mm). Having a greater diameter prevents material constitutive of the package wall, such as for instance paper fibers, to be detached by friction when said injection means of the machine is inserted therethrough. Typically, the diameter of the primary hole (which is preferably cylindrical) is comprised between 1 mm and 20 mm, preferably between 5 mm and 12 mm.

Furthermore, the secondary sheet 11 comprises a secondary hole 16 that is punched at least through the layer of paper of said sheet 11. The secondary hole 16 can also be punched through the entire thickness of the secondary sheet 11. The diameter of the secondary hole 16 is chosen in relation to the diameter of the fluid injection element of the machine to which the package is to be connected to, and is typically cylindrical with a diameter comprised between 1 mm and 20 mm, preferably between 5 mm and 12 mm.

The diameter of primary hole 15 is equal or superior to the diameter of the secondary hole 16 in the secondary flexible flat blank sheet 11.

With such a multilayer construction illustrated in FIGS. 4 and 5, having three superimposed layers in the region of the cup-shaped bottom portion 3 of the package 1, the sealing between the package 1 and the fluid injection element of the machine is ensured. When the fluid injection element of the machine is inserted through the wall of the package, it goes through the primary hole 15, then pierces the tertiary sheet 14, which is preferably—as mentioned above—a stretchable material, such that the edges of the pierced sheet 14 conform closely to the surface of the fluid injection element. Then finally, said fluid injection element moves through the secondary hole 16 so that its tip is located within the package inner compartment and a leaktight fluid communication between the inside of the package 1 and the fluid supply circuit of the machine is established.

Such a configuration also has the advantage that it requires a low strength for piercing the package wall by the fluid injection element, because the overall package thickness in the region of the holes 15, 16 and the tertiary sheet 14 is only that of the latter, while at the same time, the entire portion of the package which surrounds said region has a higher thickness, hence mechanical resistance to deformation, due to the presence of the three superimposed layers in the cup-shaped bottom portion 3 of the package.

In a preferred embodiment, illustrated in FIG. 4, the secondary thickness reinforcement sheet 11, once punched with a hole 16, is further processed by using a cutting tool that carries out a plurality of radial cuts 22 extending from the edge of the hole 16 radially outwardly. Such radial cuts 22 create a series a flaps in between them, which were found to reinforce the application of the package wall, and especially of the tertiary flexible layer 14 onto the outer surface of the fluid injection element of the machine, once said machine and package are connected to one another. This plurality of radial cuts 22 therefore reinforces the anti-leaking effect.

The package described above is manufactured with a forming machine illustrated in FIG. 6. Generally, such a machine is based partly on forming and sealing technology machines which are known in the art.

Figure 7:
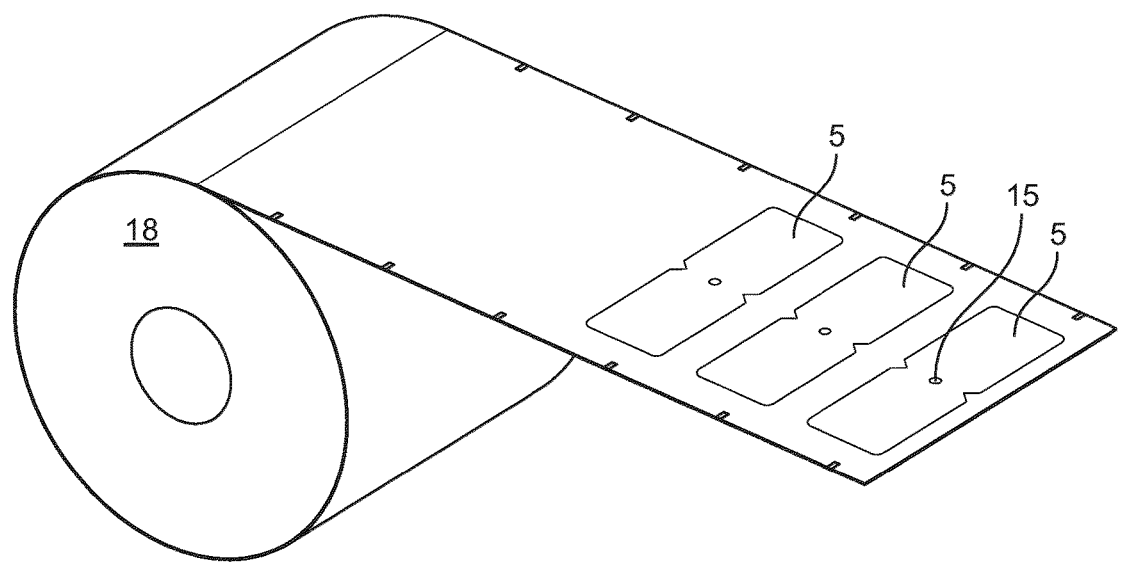
FIG. 7 is a perspective view of a roll of material for manufacturing blank sheets per the invention.

It first comprises a primary flexible flat blank sheet feeder portion 17, that is adapted to receive the primary—and optionally secondary and tertiary—flat blank sheets 5, 11, 14, preferably under the form of rolls of film as shown in FIG. 6. At this stage, and as indicated earlier, the secondary and tertiary flat blank sheets, if present, can already be assembled together with the primary sheet 5, or alternatively as illustrated in FIG. 6, the can be supplied as separate rolls of material, one roll 18 for the primary sheets, one roll 19 for the secondary sheets, and a third roll 20 for the tertiary sheets. In this case, the primary, secondary and tertiary sheets are unrolled, cut in small flat blanks, primary and secondary holes 15 and 16 are punched through respectively the primary and secondary blanks as described above, and then finally, all blanks are sealed together in an arrangement already described in relation to FIG. 4. The arrangement of individual primary flat blank sheets 5 to be cut from the corresponding roll of material 18, is illustrated in FIG. 7.

The manufacturing machine further comprises a package forming set portion 21. Downstream the package forming portion 21 is a filling and sealing portion 22 (wherein the package is filled with the ingredient and then closed by sealing the upper edge of said package).

The forming portion 21 is illustrated in more detail in FIGS. 8 to 22.

Figure 8:
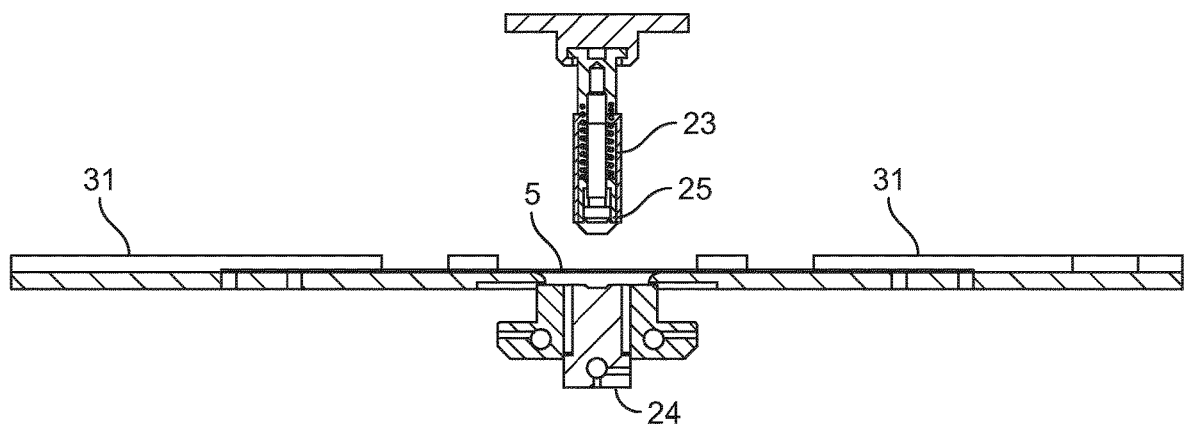
FIGS. 8 and 10 to 14 are schematic side views of a first embodiment of a forming and sealing portion in a machine for making a package, per the invention.
Figure 9:
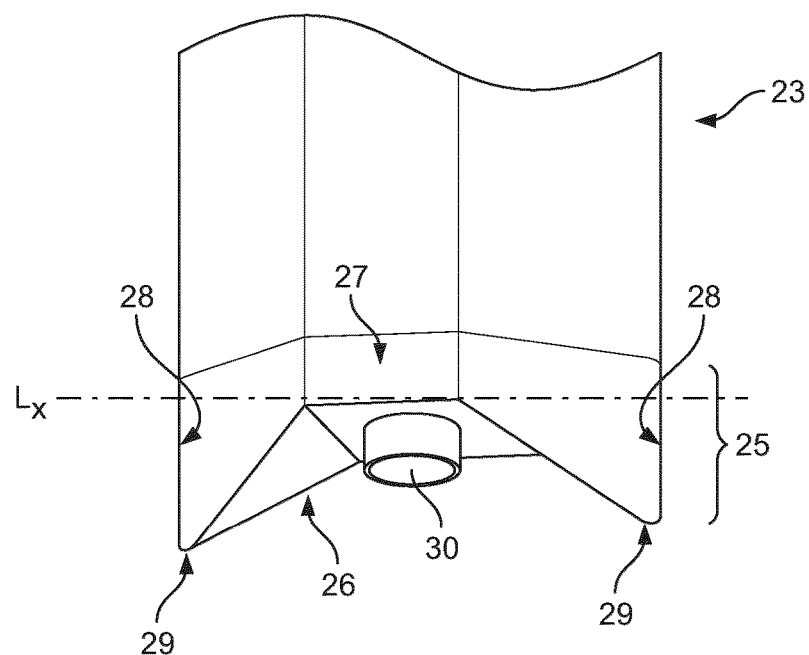
FIG. 9 is an enlarged perspective partial view of a forming plunger for making a package, per the invention.

As shown in FIG. 8, the forming portion of the machine comprises a forming plunger 23 and a forming cavity 24 that are movable relative to one another and have complementary shapes. By "cavity 24", it is meant a cylinder whose tip is hollowed with a shape that is complementary to the outer shape of the lower end 25 of the plunger. Such a principle of forming station with movable plunger and cavity for deforming a material placed in between is generally known and the details of it will not be described in more detail. The end portion 25 of the plunger 23 (i.e. its lower extremity), as illustrated in FIG. 9, has a volumetric shape with a concave lower end 26 and convex lateral sides 27, such that the profile of its end side 26 is identical to the profile of each of its lateral sides 27. The principle of the geometrical equivalence between profiles 26 and 27 is the same as already described above for the profiles Pit and $P_{lw}$, of the cup-shaped bottom portion 3, in relation to FIGS. 3A and 3B.

In one particular embodiment, the end portion 25 of the plunger 23 has an hexagonal prism shape, said prism having two opposed vertical edges 28 aligned with the plunger transversal axis Lx, that extend downwardly to form downwardly extending tips 29, said extended edges 28 having a height such that, for each transversal cross section of the plunger measured all along its transversal axis Lx, the sum of two heights of the end portion 25 plus the width of its lower side, is constant. This principle is the same as that already described above for heights H1, H2 and widths W1 and W2 of the cup-shaped bottom portion 3, in relation to FIGS. 3A and 3B.

Preferably, the tips 29 of the plunger are rounded or otherwise smooth-edged.

As illustrated in FIG. 9, the lower end 26 of the plunger preferably comprises a retractable protrusion 30 that is aligned with the centre of said plunger 23. Said protrusion 30 is spring-mounted so as to retract within the plunger 23 when it is pressed against a surface, in particular in this case against the primary flat blank sheet 5 and the forming station cavity 24 underneath. This protrusion has a diameter which is superior to the diameter of the primary hole 15 and secondary hole 16 described above. Its function is to press gently onto the blanks 5, 11, and 14 before the plunger starts deforming the same. When the forming process starts and the blank sheets start to deform, it maintains the three blanks sheets together in their sealed region (around the holes 15 and 16 as described above), to prevent unsealing and sliding due to the mechanical forces that apply in the material during the forming step.

The machine further comprises an actuator (not illustrated) for moving the plunger 23 and the cavity 24 towards one another, and also relatively to the blank sheet 5 which is placed between the two as shown in FIG. 8.

Figure 14:
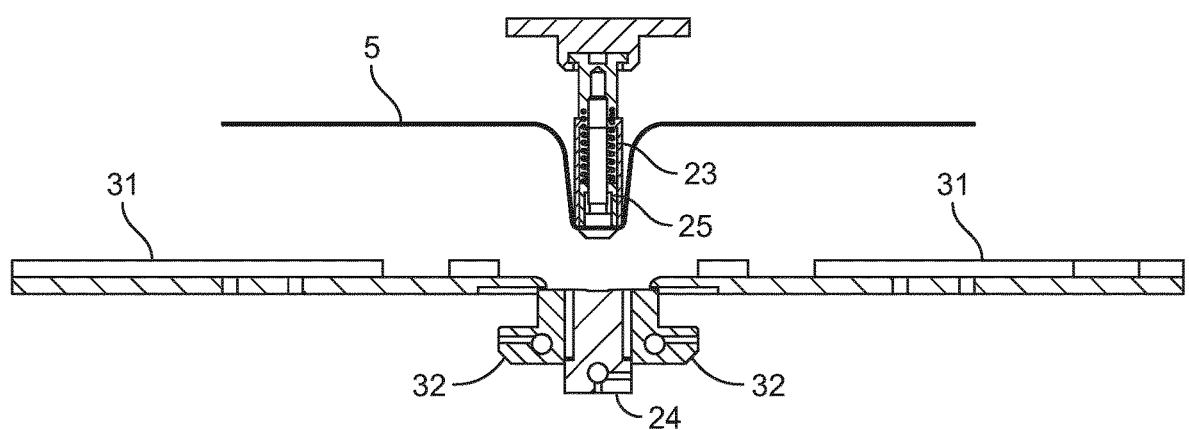
Figure 15:
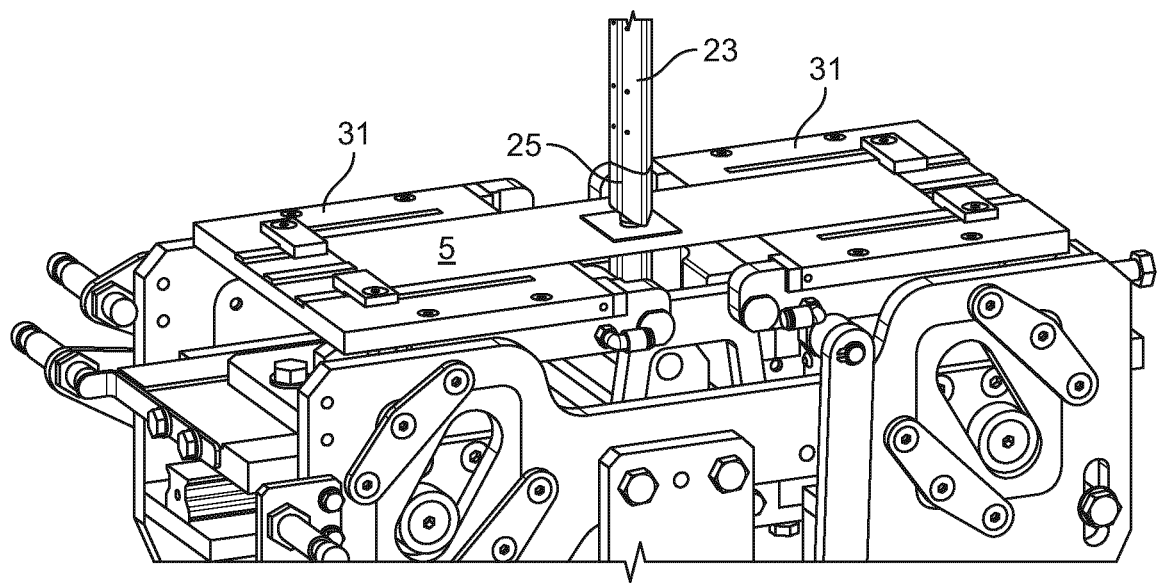
FIGS. 15 to 19 and FIG. 21 are schematic side views of an alternative embodiment of a forming and sealing portion shown in FIGS. 8 and 10 to 14.
Figure 16:
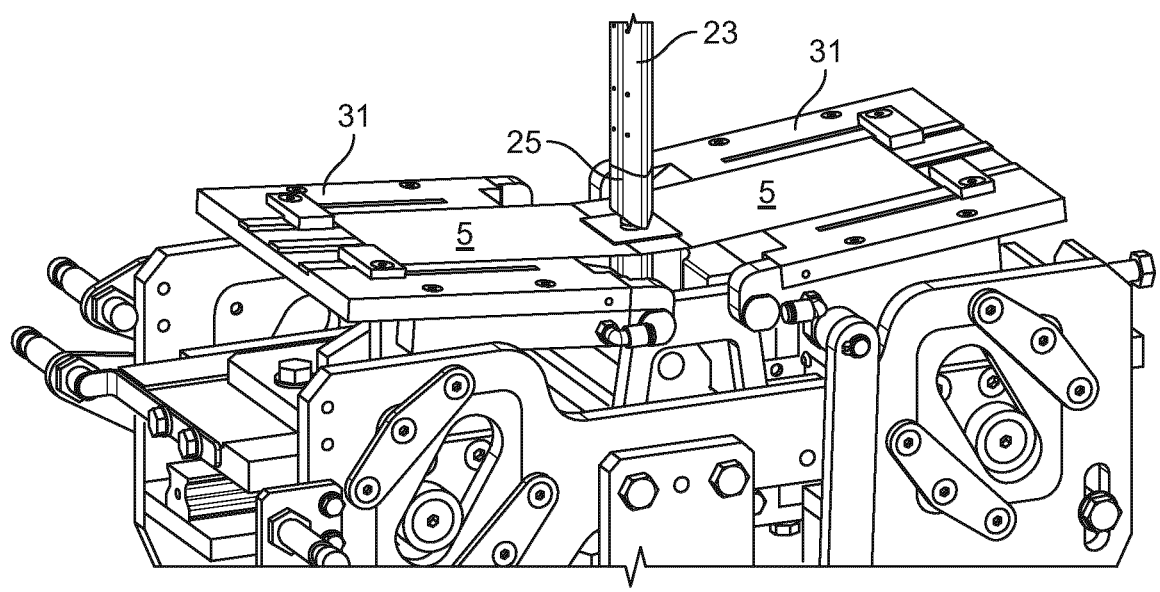
Figure 17:
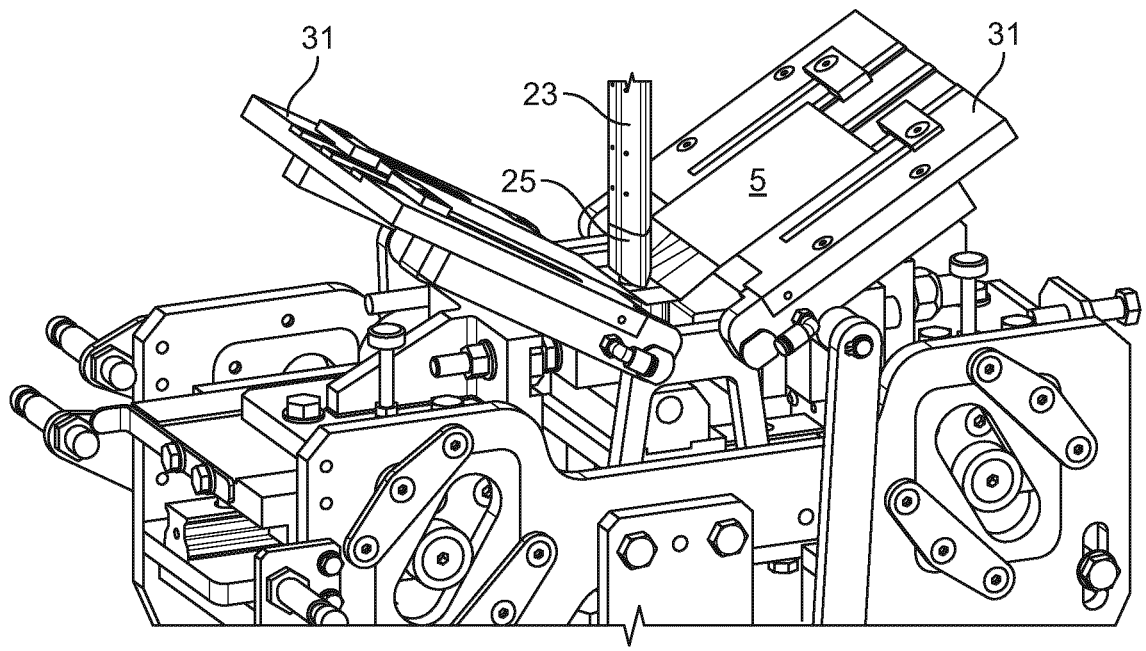
Figure 18:
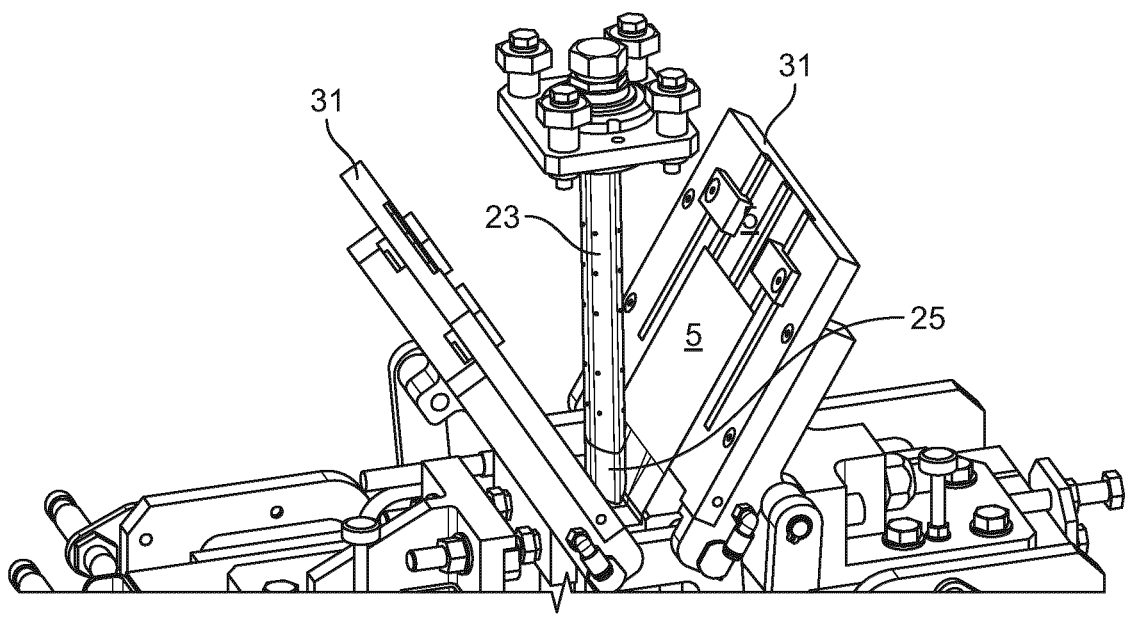
Figure 19:
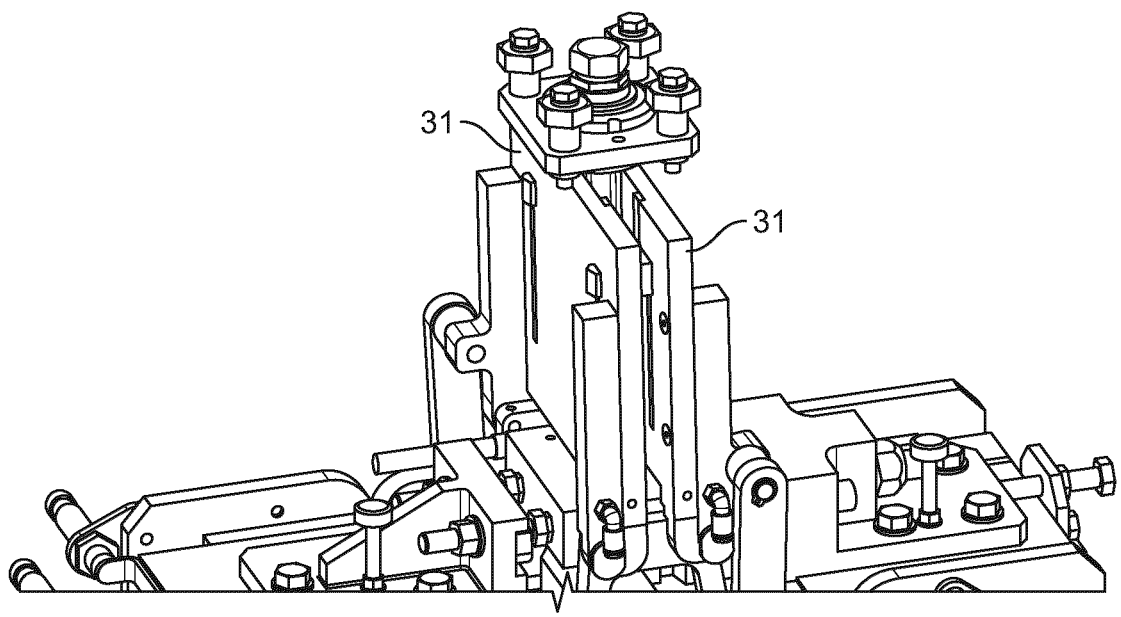

As shown in FIGS. 15 to 19 and 21, the machine further comprises a pair of plates adapted to support said flexible blank sheet 5. Both plates are coplanar at the beginning of the forming process, as illustrated in FIG. 15. Each plate supporting a flap of the primary flexible blank sheet. Said plates 31 can be fixed as illustrated in FIGS. 8 and 10 to 14. Alternatively in another possible embodiment, the plates 31 are symmetrically pivotable around respective axes that are each located from either side of said plunger 23, as shown in FIGS. 16 to 19 and 21, which represent various positions of said pivotable plates 31 during the forming process.

In the following, it is considered that the primary flat blank sheet 5 which is processed comprises also secondary 11 and tertiary 14 blank sheets attached to it, as described above. Once the blank 5 is transported along the machine to the forming portion 21 of said machine and is in place between the plunger 23 and the cavity 24 as shown in FIG. 8, the forming process steps are as follows, in order.

Figure 10:
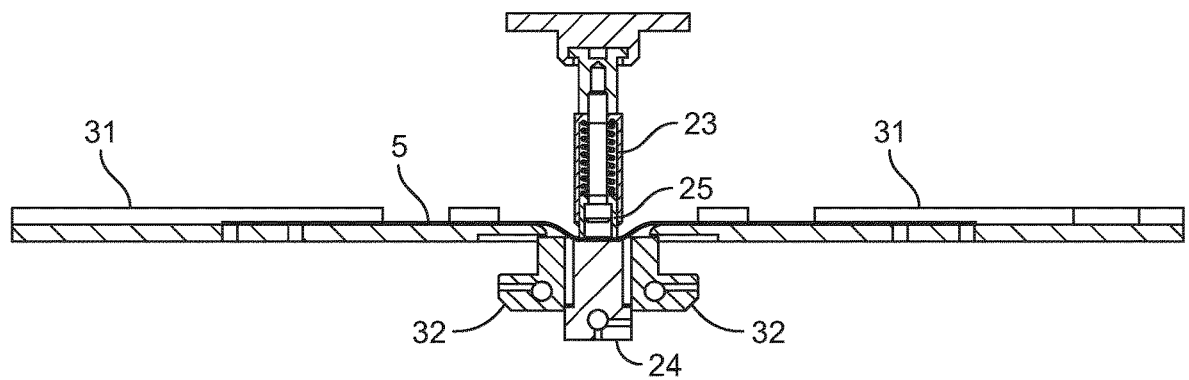
Figure 11:
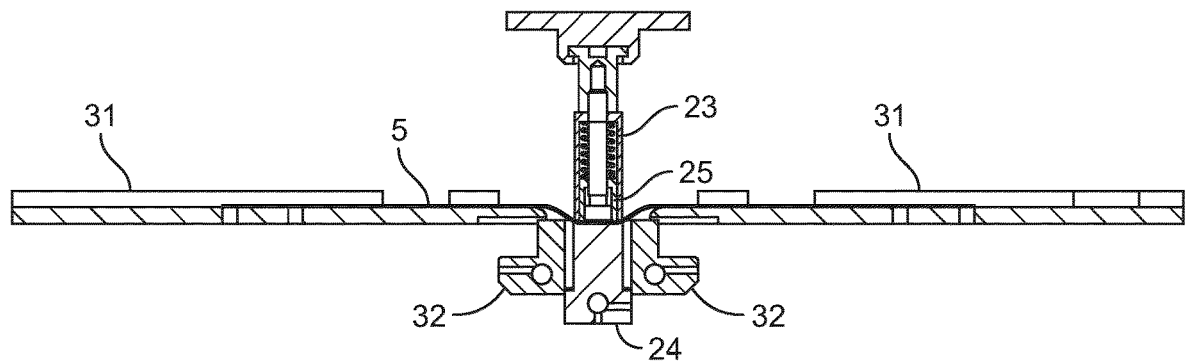

The plunger 23 moves downwardly until it contacts the upper surface of the blanks 5, 11 and 14, as shown in FIGS. 10 and 11; the movement of the plunger starts to deform said blanks which are folded around the transversal axis Lx of the primary blank 5; after contacting the upper surface of the blanks 5, 11 and 14, due to the counterpressure of the cavity 24 underneath, the retractable protrusion 30 of the plunger 23 retracts into the latter as shown in FIG. 11.

Figure 12:
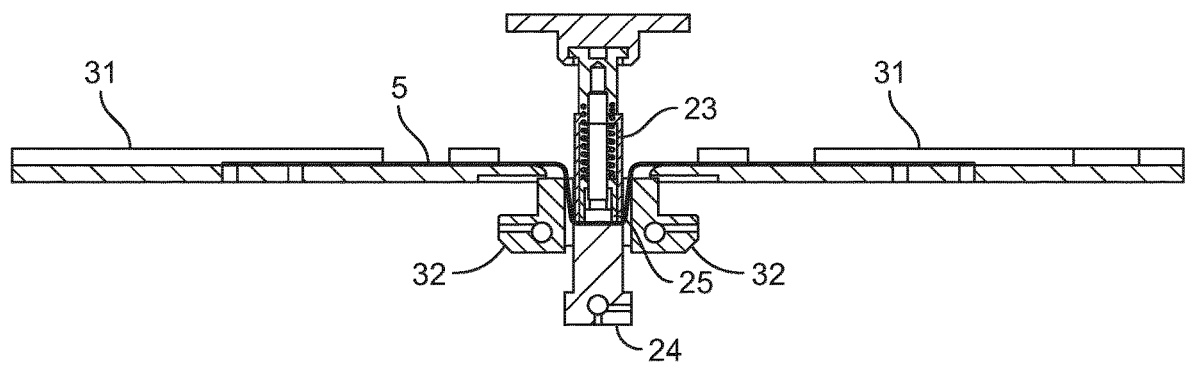

The plunger 23 continues to move downwardly and the cavity 24 moves downwardly as well, as shown in FIG. 12. They both pull the blanks 5, 11 and 14 with them downwardly as the latter are pinched between said plunger 23 and cavity 24.

During the preceding steps, a pair (or "set") of sealing jaws 32 are located from either side of the cavity 24, which are adapted to seal the lateral edges of the blank sheet 5 once it is U-shaped folded. During the forming steps above, the jaws are in the open position, i.e. distant from the group of plunger, cavity and blank.

Figure 13:
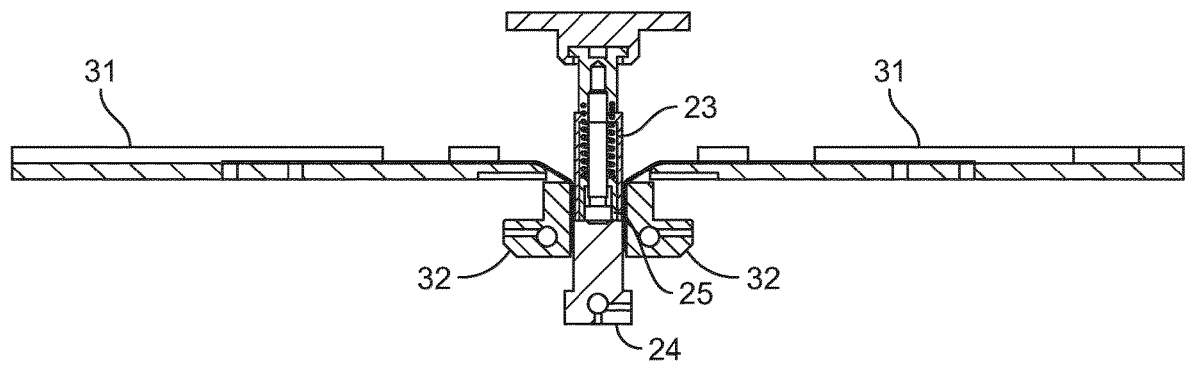
Figure 20:
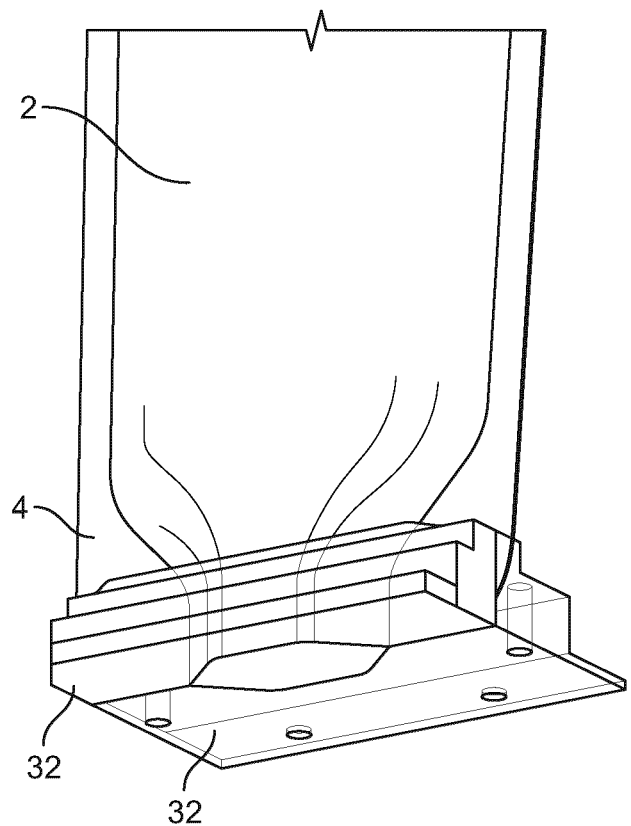
FIG. 20 is a partial perspective view of sealing jaws in a forming a sealing machine for making a package, per the invention.
Figure 21:
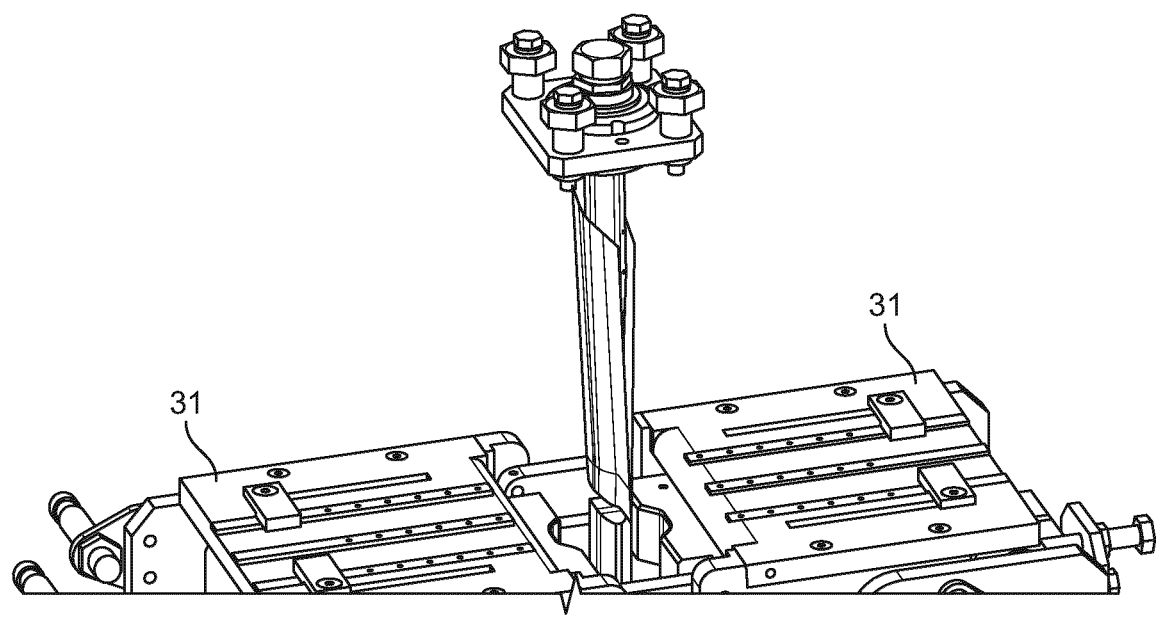

After the cavity and plunger have moved down as described above, the jaws 32 move towards one another to close around the blank, in its lower portion as illustrated in FIG. 13 and FIG. 20. They seal (by ultrasonic sealing or heat sealing process) the lateral edges of the U-shaped folded blank so as to complete the formation of a fully formed and sealed cup-shaped bottom portion 3 of the package 1.

Then, the jaws 32 re-open and the plunger 23 moves upwardly together with the partially folded and sealed package 1, as shown in FIG. 14.

A variation of the same forming sequence described above is illustrated in FIGS. 15 to 19 and 21, with the difference that the supporting plates 31 are pivoted during the movement of the plunger and cavity, in order to guide the folding of the blank's free ends in a U-shape.

Finally, as shown in FIG. 15, the package is fully U-shape folded with still unsealed side walls 2 that form a flatten package body, and a sealed cup-shaped bottom portion 3 being a hollow volume having the shape of said plunger.

Figure 22:
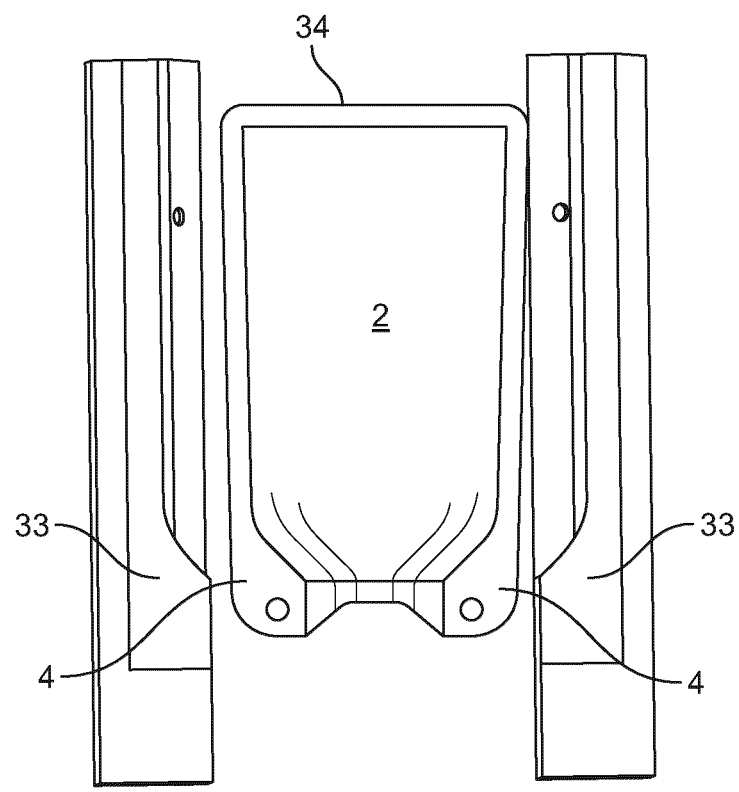
FIG. 22 is a schematic side view of sealing jaws for sealing the lateral sides of a package, per the invention.

It is then transferred to a sealing station having elongated sealing jaws 33 that seals the lateral edges 4 of the package 1, as shown in FIG. 22. The package 1 is now ready for filling with an ingredient and then closing by sealing its upper edge 34.

In the embodiment wherein the package cup-shaped bottom portion 3 has an improved wall thickness, by attaching secondary and tertiary layers 11 and 14 as described above, the primary, secondary and tertiary flat blank sheets 5, 11, 14 can be attached one to another at the time the primary sheet 5 is manufactured as a roll of film (at the film manufacturer facilities), or alternatively, the secondary and tertiary flat blank sheets 11, 14 can be attached to the primary flat blank sheet at a later stage, just before the forming of the latter (i.e. on the package manufacturing line).

According to the present invention the food or beverage ingredient packed in the package is a water soluble powder or a soluble concentrate in liquid or semi-liquid form, selected within the list of: soups, fruit juices, vegetable juices, bouillons, coffee, chocolate, tea, milk or creamer, smoothies, purees, coulis, creams or a combination thereof. Preferably the food or beverage ingredient is a soluble food or beverage ingredient selected in the list of:

instant coffee powder, milk powder, cream powder, instant tea powder, cocoa powder, soup powder, fruit powder or mixture of said powders, a coffee concentrate, a milk concentrate, a syrup, a fruit or vegetable concentrate, a tea concentrate, a fruit or vegetable puree.

The package can also contain plant leaves for infusion, such as tea leaves for instance.

The powders can be agglomerated or sintered. The powders or liquid concentrates can be mixed with solid pieces for example for preparing soups with solid or encapsulated pieces. The food or beverage ingredient can also be an infusable food or beverage ingredient like a roast and ground coffee, or tea leaves. In that embodiment water extracts the infusable ingredient.

In the present invention fluid covers either any aqueous diluent that can be mixed with a soluble beverage ingredient to prepare a beverage, like water, carbonated water, milk, etc. (preferably, water is the preferred aqueous diluent) or any gaseous fluid such as for example air. When referring to aqueous fluid, water is the preferred fluid; when referring to gaseous fluid, air is the preferred fluid.

According to the invention, the package is arranged essentially vertically during the production and dispensing of the food or beverage product.

According to the present invention, the aqueous fluid, typically water, is supplied into the package at any temperature: cold, ambient or hot, depending on the type of food or beverage product to be prepared.

In contrast with the systems in the known prior art where the fluid is introduced from top to bottom, in this case the beverage preparation machine injects water—and also optionally air—from the bottom to the top of the package, at a high velocity, which allows optimal turbulences inside the package compartment, and therefore optimal dissolution of the ingredient contained inside. If air is also injected with water, through the injecting means of the machine, it is not introduced at high pressure; the pressure is preferably comprised between 0.1 and 1.5 bar, more preferably between 0.3 and 0.5 bar. According to the invention, optimal turbulences and dissolution of the ingredient are obtained by high velocity, not by high pressure.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

The invention claimed is:

1. A flexible or semi-flexible closed package for containing an ingredient for preparing an edible product in a food or beverage preparation machine by mixing the ingredient with a mixing fluid injected in the flexible or semi-flexible closed package by the food or beverage preparation machine, the flexible or semi-flexible closed package comprising:
   (i) a plurality of flexible or semi-flexible lateral walls that form a flattened package body, and
   (ii) a cup-shaped bottom portion adapted for insertion of a fluid injection element of the food or beverage preparation machine,
   the flattened package body and the cup-shaped bottom portion being formed from a one-piece elongated primary flat blank sheet made of flexible material folded in a U-shape around a transversal symmetry axis and sealed along lateral and upper edges, wherein the cup-shaped bottom portion is a hollow volume having a concave lower side and convex lateral sides, a profile curvature of the concave lower side being identical to a profile curvature of each of the lateral sides, the one-piece elongated primary flat blank sheet comprising a primary hole that is punched through a thickness of the one-piece elongated primary flat blank sheet, the primary hole being located on the concave lower side of the cup-shaped bottom portion, and wherein the flexible or semi-flexible closed package further comprises:
   a secondary thickness reinforcement sheet located at least on an inner surface of the cup-shaped bottom portion of the flexible or semi-flexible closed package, the secondary thickness reinforcement sheet comprising a secondary hole, and
   a tertiary thin sheet sandwiched between the flexible or semi-flexible lateral walls of the flexible or semi-flexible closed package and the secondary thickness reinforcement sheet.

2. The flexible or semi-flexible closed package according to claim 1, wherein the cup-shaped bottom portion has a hexagonal prism shape, the hexagonal prism shape having two opposed vertical edges aligned with the transversal symmetry axis that extend downwardly to form downwardly extending tips, the two opposed vertical edges having a height such that, for each transversal cross section of the flexible or semi-flexible closed package measured along the transversal symmetry axis, a sum of two heights of the cup-shaped bottom portion plus a width of the concave lower side is constant.

3. The flexible or semi-flexible closed package according to claim 1, wherein the one-piece elongated primary flat blank sheet is made of a fiber-based material coated on its inner side with a sealant layer, the fiber-based material fibre based layer being selected from the group consisting of: paper, cardboard, cabasse-based material, bamboo-based material, starch-based material, cellophane, and a combination thereof.

4. The flexible or semi-flexible closed package according to claim 3, wherein the primary flat blank sheet further comprises a barrier coating sandwiched between the fiber-based material and the sealant layer, the barrier coating being a coating against oxygen and/or moisture transfer, the barrier coating being selected from the group consisting of: metallization coating, silicone oxide (SiOx) coating, aluminium oxide (AlOx) coating, atomic layer deposition (ALD) coating, and a combination thereof.

5. The flexible or semi-flexible closed package according to claim 1, wherein diameters of the primary and secondary holes are between 1 mm and 20 mm.

6. The flexible or semi-flexible closed package according to claim 5, wherein the diameter of primary hole is equal to or greater than the diameter of the secondary hole.

7. The flexible or semi-flexible closed package according to claim 1, wherein the secondary thickness reinforcement sheet comprises a plurality of radial cuts extending radially outwardly from an edge of the secondary hole.

8. The flexible or semi-flexible closed package according to claim 1, wherein the secondary thickness reinforcement sheet is made of fiber-based material coated with a sealant layer, the fiber-based material being selected from the group consisting of: paper, cardboard, cabasse-based material, bamboo-based material, starch-based material, cellophane, and a combination thereof.

9. The flexible or semi-flexible closed package according to claim 1, wherein the tertiary thin sheet is a thin layer selected from the group consisting of: polyethylene (PE), polypropylene (PP), polylactide (PLA), polyhydroxyalcanoates (PHA), polybutylene adipate terephthalate (PBAT), polybutylene succinate (PBS), polyvinyl alcohol (PVOH), starch-based polymers, a polymer comprising food-grade oxygen and/or moisture scavengers, and a combination thereof.

10. The flexible or semi-flexible closed package according to claim 9, wherein the tertiary thin sheet is made from blown or cast polymer film having stretch properties.

11. The flexible or semi-flexible closed package according to claim 1, which comprises an identification member selected from the group consisting of: mechanical codes, optical codes, RFID tags, one-dimensional bar codes, two-dimensional bar codes, magnetic codes, conductivity codes, detection holes, and any combination thereof.

12. The flexible or semi-flexible closed package according to claim 1, which further comprises centering traversing holes located in the lateral and upper edges of the flexible or semi-flexible closed package, the centering traversing holes being adapted for insertion of centering pins of the food or beverage preparation machine, so as to prevent movement of the flexible or semi-flexible closed package relative to the food or beverage preparation machine during beverage preparation.

13. The flexible or semi-flexible closed package according to claim 1, wherein the concave lower side comprises a flat portion centered across transversal and longitudinal axes of the cup-shaped bottom portion.

14. The flexible or semi-flexible closed package according to claim 1, wherein the flexible or semi-flexible closed package comprises a sachet or a pouch.

15. The flexible or semi-flexible closed package according to claim 1, wherein the ingredient is a water soluble powder or a soluble concentrate in liquid or semi-liquid form, wherein the soluble concentrate is selected from the group consisting of: soups, fruit juices, vegetable juices, bouillons, coffee, chocolate, tea, and dairy components, or the ingredient comprises plant leaves adapted to infusion in water.

16. The flexible or semi-flexible closed package according to claim 1, wherein the flexible material is a fiber-based material.

17. The flexible or semi-flexible closed package according to claim 11, wherein the optical codes include color codes and codes printed with non-visible ink.

18. The flexible or semi-flexible closed package according to claim 15, wherein the dairy components are milk, creamer, smoothies, purees, coulis, creams or a combination thereof.

* * * * *